United States Patent
Iwamoto et al.

(10) Patent No.: US 9,680,177 B2
(45) Date of Patent: Jun. 13, 2017

(54) ALL-SOLID-STATE THIN-FILM BATTERY

(71) Applicant: Panasonic Intellectual Property Management Co., Ltd., Osaka (JP)

(72) Inventors: Kazuya Iwamoto, Osaka (JP); Hitoshi Kimura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/714,252

(22) Filed: May 16, 2015

(65) Prior Publication Data

US 2015/0340727 A1 Nov. 26, 2015

(30) Foreign Application Priority Data

May 20, 2014 (JP) .................. 2014-104665

(51) Int. Cl.
| | | |
|---|---|---|
| H01M 10/04 | (2006.01) | |
| H01M 10/052 | (2010.01) | |
| H01M 10/0562 | (2010.01) | |
| H01M 10/0585 | (2010.01) | |
| H01M 6/40 | (2006.01) | |

(52) U.S. Cl.
CPC ... *H01M 10/0436* (2013.01); *H01M 10/0463* (2013.01); *H01M 10/052* (2013.01); *H01M 10/0562* (2013.01); *H01M 10/0585* (2013.01); *H01M 6/40* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 2003/0232248 A1* | 12/2003 | Iwamoto | H01M 4/66 429/233 |
| 2005/0141170 A1 | 6/2005 | Honda et al. | |
| 2016/0172704 A1* | 6/2016 | Watanabe | H01M 10/0562 429/160 |

FOREIGN PATENT DOCUMENTS

| | | |
|---|---|---|
| JP | 2002-042863 | 2/2002 |
| JP | 2003-282142 | 10/2003 |
| JP | 2009-301727 | 12/2009 |

OTHER PUBLICATIONS

B. Wang et al., "Characterization of Thin-Film Rechargeable Lithium Batteries with Lithium Cobalt Oxide Cathodes" Journal of the Electrochemical Society, vol. 143, No. 10, Oct. 1996.

(Continued)

*Primary Examiner* — Patrick Ryan
*Assistant Examiner* — Haixia Zhang
(74) *Attorney, Agent, or Firm* — McDermott Will & Emery LLP

(57) ABSTRACT

An all-solid-state thin-film battery according to an aspect of the present disclosure includes: a solid electrolyte layer; a cathode active material layer; a cathode current collector layer including a first portion and a second portion; an anode terminal layer; and an anode layer including a third portion and a fourth portion. The first contact surface between the solid electrolyte layer and the cathode active material layer, the second contact surface between the solid electrolyte layer and the first portion of the cathode current collector layer, and the third contact surface between the third portion of the anode layer and the anode terminal layer are located within a single plane.

9 Claims, 6 Drawing Sheets

(56) References Cited

OTHER PUBLICATIONS

Steven D. Jones et al., "A microfabricated solid-state secondary Li battery" Solid State Ionics, vol. 86-88, 1996, pp. 1291-1294.

* cited by examiner

ALL-SOLID-STATE THIN-FILM BATTERY

BACKGROUND

1. Technical Field

The present disclosure relates to an all-solid-state thin-film battery.

2. Description of the Related Art

Secondary batteries containing a solid electrolyte are referred to as all-solid-state batteries. An example of an all-solid-state battery is a lithium ion secondary battery containing a solid electrolyte.

In fields such as battery-powered IC (integrated circuit) cards, RFID (radio frequency identifier) tags, smartwatches, and wearable equipment, there is a demand for thin-film batteries and/or flexible batteries.

Japanese Unexamined Patent Application Publication Nos. 2002-42863 and 2003-282142 disclose a multilayer thin-film solid secondary battery that includes a stack of multiple thin-film solid secondary battery cells.

SUMMARY

Known all-solid-state thin-film batteries have problems that prevent them from fully displaying their battery characteristics.

One non-limiting and exemplary embodiment provides an all-solid-state thin-film battery that can display good battery characteristics.

An all-solid-state thin-film battery according to an aspect of the present disclosure includes: a solid electrolyte layer including a first principal surface and a second principal surface opposite the first principal surface; a cathode active material layer including a third principal surface and a fourth principal surface opposite the third principal surface, the third principal surface being in contact with the first principal surface of the solid electrolyte layer; a cathode current collector layer including a first portion and a second portion, the first portion being in contact with the first principal surface of the solid electrolyte layer, the second portion being in contact with the fourth principal surface of the cathode active material layer; an anode terminal layer spaced from the cathode active material layer and the cathode current collector layer; and an anode layer including a third portion and a fourth portion, the third portion being in contact with the anode terminal layer, the fourth portion being in contact with the second principal surface of the solid electrolyte layer. A first contact surface between the solid electrolyte layer and the cathode active material layer, a second contact surface between the solid electrolyte layer and the first portion of the cathode current collector layer, and a third contact surface between the third portion of the anode layer and the anode terminal layer are located within a single plane.

It should be noted that these comprehensive or specific embodiments may be implemented as a manufacturing method.

An all-solid-state thin-film battery according to an aspect of the present disclosure can display good battery characteristics.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
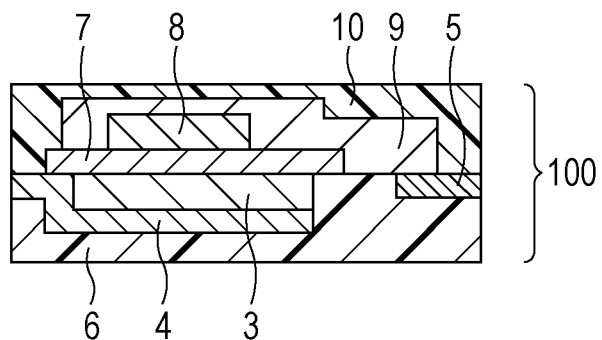
FIG. 1 is a cross-sectional diagram that illustrates an example of a structure of an all-solid-state thin-film battery according to Embodiment 1.

Underlying Knowledge Forming Basis of the Present Disclosure

To improve the battery characteristics of all-solid-state thin-film batteries, the inventors researched the prior art of all-solid-state thin-film batteries.

Japanese Unexamined Patent Application Publication Nos. 2002-42863 and 2003-282142 disclose manufacturing methods that include stacking all-solid-state thin-film batteries using sputtering or vapor deposition. These methods, however, include annealing the cathode in an oxidizing atmosphere, which may damage other layers formed before the cathode. This means that known all-solid-state thin-film batteries, for example, have a disadvantage including the following: annealing during manufacture affects their battery characteristics; avoiding annealing during manufacture results in insufficient battery characteristics; or the choice of materials for the cathode is limited.

The inventors studied all-solid-state thin-film batteries having an annealable cathode active material layer, and thus found the techniques disclosed here. The techniques disclosed here can improve, for example, the energy density and charge/discharge capacity of all-solid-state thin-film batteries.

These findings should be construed as helping to understand the following embodiments, rather than limiting the present disclosure. For example, all-solid-state thin-film batteries according to the present disclosure are not limited to any particular manufacturing method.

Overview of Embodiments

An all-solid-state thin-film battery according to an aspect of the present disclosure includes: a solid electrolyte layer having a first principal surface and a second principal surface opposite the first principal surface; a cathode active material layer having a third principal surface and a fourth principal surface opposite the third principal surface, the third principal surface being in contact with the first principal surface of the solid electrolyte layer; a cathode current collector layer including a first portion and a second portion, the first portion being in contact with the first principal surface of the solid electrolyte layer and the second portion being in contact with the fourth principal surface of the cathode active material layer; an anode terminal layer spaced from the cathode active material layer and the cathode current collector layer; and an anode layer including a third portion and a fourth portion, the third portion being in contact with the anode terminal layer and the fourth portion being in contact with the second principal surface of the solid electrolyte layer. A first contact surface between the solid electrolyte layer and the cathode active material layer, a second contact surface between the solid electrolyte layer and the first portion of the cathode current collector layer, and a third contact surface between the third portion of the anode layer and the anode terminal layer are included in a single plane.

All-solid-state thin-film batteries having this structure can display good battery characteristics. For example, the arrangement in which the solid electrolyte layer is in contact with the cathode active material layer and the cathode current collector layer in the same flat plane reduces the occurrence of cracks in the solid electrolyte layer, thereby preventing deteriorated characteristics thereof.

The term "plane" refers to a substantially flat plane that has no step exceeding the surface roughness of the individual layers involved. For example, if the entire all-solid-state thin-film battery is flexible, the term "substantially flat plane" includes a continuous plane deformed as the entire all-solid-state thin-film battery is deformed.

In the all-solid-state thin-film battery, the third portion of the anode layer may include an anode active material layer, and the fourth portion of the anode layer may include an anode current collector layer, for example.

In the all-solid-state thin-film battery, the solid electrolyte layer may have a flat-plate shape, for example.

This can effectively reduce the occurrence of cracks in the solid electrolyte layer.

The all-solid-state thin-film battery may further have, for example, a protective layer that covers at least the solid electrolyte layer and the anode layer and is in contact with the anode terminal layer in the aforementioned single plane.

The all-solid-state thin-film battery may further have, for example, a coating layer that covers at least the cathode current collector layer and the anode terminal layer and is in contact with the protective layer in the aforementioned single plane.

The all-solid-state thin-film battery may further have, for example, a coating layer that covers at least the cathode current collector layer and the anode terminal layer and is in contact with the solid electrolyte layer in the aforementioned single plane. This structure, in which the solid electrolyte layer is in contact with the coating layer, the cathode active material layer, and the cathode current collector layer in the same flat plane, can reduce the occurrence of cracks in the solid electrolyte layer and thus can prevent deteriorated characteristics.

In the all-solid-state thin-film battery, the protective layer may have, for example, a step surface and a principal flat surface opposite the step surface, the step surface extending at least along the solid electrolyte layer and the anode layer.

In the all-solid-state thin-film battery, the coating layer may have, for example, a step surface and a principal flat surface opposite the step surface, the step surface extending at least along the cathode current collector layer and the anode terminal layer.

In the all-solid-state thin-film battery, the cathode current collector layer and the anode terminal layer may be made of the same material, for example.

The all-solid-state thin-film battery may have, for example, a first battery portion and a second battery portion located on the first battery portion. The first battery portion may include the following components: a first solid electrolyte layer as the aforementioned solid electrolyte layer; a first cathode active material layer as the aforementioned cathode active material layer; a first cathode current collector layer as the aforementioned cathode current collector layer; a first anode terminal layer as the aforementioned anode terminal layer; a first protective layer that covers at least the first solid electrolyte layer and the first anode layer; and a first coating layer that covers at least the first cathode current collector layer and the first anode terminal layer. The second battery portion may include the following components: a second solid electrolyte layer having a fifth principal surface and a sixth principal surface opposite the fifth principal surface; a second cathode active material layer having a seventh principal surface and an eighth principal surface opposite the seventh principal surface, the seventh principal surface being in contact with the fifth principal surface of the second solid electrolyte layer; a second cathode current collector layer including a fifth portion and a sixth portion, the fifth portion being in contact with the fifth principal surface of the second solid electrolyte layer and the sixth portion being in contact with the eighth principal surface of the second cathode active material layer; a second anode terminal layer spaced from the second cathode active material layer and the second cathode current collector layer; a second anode layer including a seventh portion and an eighth portion, the seventh portion being in contact with the second anode terminal layer and the eighth portion being in contact with the sixth principal surface of the second solid electrolyte layer; a second protective layer that covers at least the second solid electrolyte layer and the second anode layer; and a second coating layer that covers at least the second cathode current collector layer and the second anode terminal layer and is in contact with the first protective layer.

This structure, in which the first protective layer and the second protective layer are in contact with each other with no substrate or other materials therebetween, can improve the energy density.

The all-solid-state thin-film battery may further have, for example, a third battery portion located on the second battery portion and having the same structure as the first battery portion.

The all-solid-state thin-film battery, for example, may include: a first battery portion including the aforementioned solid electrolyte layer, the aforementioned cathode active material layer, the aforementioned cathode current collector layer, the aforementioned anode terminal layer, and the aforementioned anode layer; a flexible plastic layer located on the first battery layer; and a second battery portion located on the flexible plastic layer and having the same structure as the first battery portion.

The following describes some embodiments of the present disclosure with reference to drawings. All of the following embodiments illustrate comprehensive or specific examples. Any value, shape, material, component, arrangement or connection of components, process condition, step, order of steps, or similar information mentioned in the following description of embodiments is for illustrative purposes and not intended to limit the present disclosure. The components mentioned in the following description of embodiments are optional components, unless they are specified in an independent claim representing the broadest concept. The drawings are schematic diagrams and not necessarily precise illustrations.

Embodiment 1

[Structure of the All-Solid-State Thin-Film Battery]

FIG. 1 illustrates an example of a structure of an all-solid-state thin-film battery 100 according to Embodiment 1.

As illustrated in FIG. 1, the all-solid-state thin-film battery 100 has a solid electrolyte layer 7, a cathode active material layer 3, a cathode current collector layer 4, an anode terminal layer 5, an anode active material layer 8, and an anode current collector layer 9.

The solid electrolyte layer 7 has a first principal surface and a second principal surface opposite the first principal surface. The cathode active material layer 3 is located on the first principal surface of the solid electrolyte layer 7. The cathode current collector layer 4 is located on the cathode active material layer 3. A portion of the cathode current collector layer 4 is in contact with the first principal surface of the solid electrolyte layer 7. An end of the cathode current collector layer 4 functions as a cathode terminal layer. The anode active material layer 8 and the anode current collector layer 9 each are a part of an anode layer. The anode layer is located on the second principal surface of the solid electrolyte layer 7.

The plane of contact between the solid electrolyte layer 7 and the cathode active material layer 3, the plane of contact between the solid electrolyte layer 7 and the cathode current collector layer 4, and the plane of contact between the anode current collector layer 9 and the anode terminal layer 5 are included in a single flat plane. In other words, the plane of contact between the solid electrolyte layer 7 and the cathode active material layer 3, the plane of contact between the solid electrolyte layer 7 and the cathode current collector layer 4, and the plane of contact between the anode current collector layer 9 and the anode terminal layer 5 are flush with each other. There is, therefore, no step between these planes. This can reduce the occurrence of cracks in the solid electrolyte layer 7, thereby suppressing the deterioration of the characteristics of the all-solid-state thin-film battery 100.

Examples of materials for the individual layers of the all-solid-state thin-film battery 100 are provided in the description of a manufacturing method that follows. It should, however, be noted that all-solid-state thin-film batteries according to the present disclosure are not limited to any particular manufacturing method.

Figure 2:
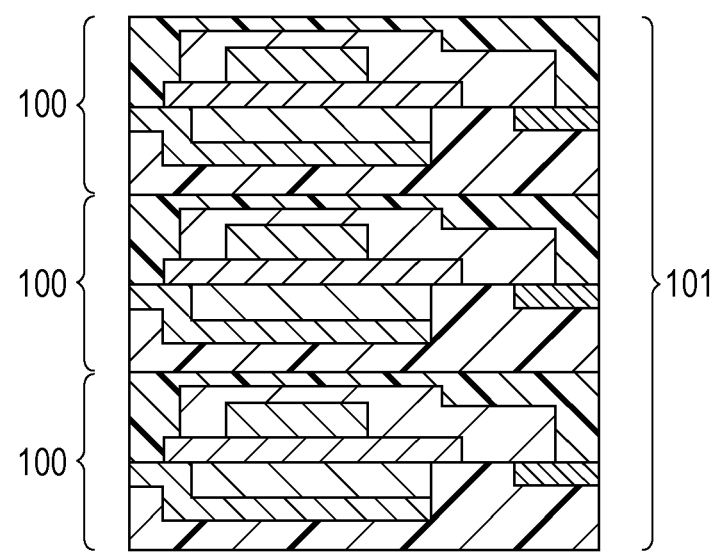
FIG. 2 is a cross-sectional diagram that illustrates an example of a structure of an all-solid-state thin-film battery according to Embodiment 1 in a first stacked form.

FIG. 2 illustrates an example of a structure of a multilayer all-solid-state thin-film battery 101 that includes a stack of multiple all-solid-state thin-film batteries 100.

Figure 3:
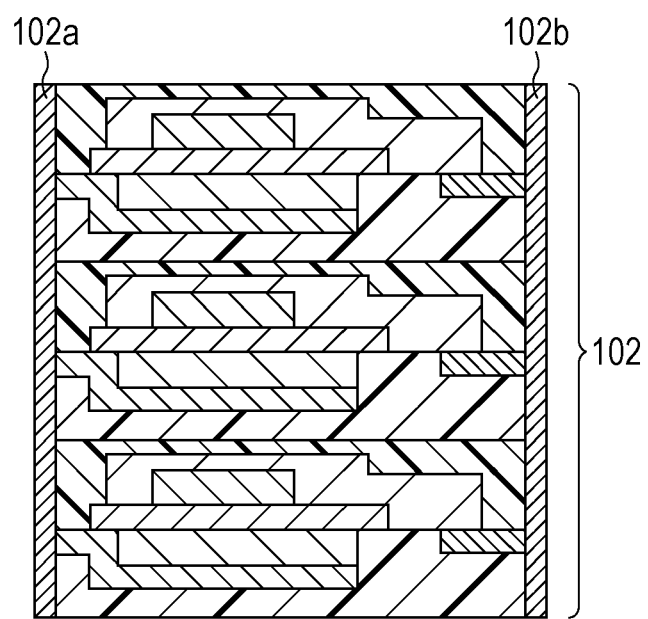
FIG. 3 is a cross-sectional diagram that illustrates an example of a structure of an all-solid-state thin-film battery according to Embodiment 1 in a second stacked form.

FIG. 3 illustrates an example of a structure of a multilayer all-solid-state thin-film battery 102 in which multiple all-solid-state thin-film batteries 100 are in parallel connection.

The multilayer all-solid-state thin-film battery 102 has a cathodic outer electrode 102a and an anodic outer electrode 102b. At an end face of the all-solid-state thin-film battery 102, multiple cathode current collector layers 4 are connected with each other via the cathodic outer electrode 102a. At an end face of the all-solid-state thin-film battery 102, multiple anode terminal layers 5 are connected with each other via the anodic outer electrode 102b.

The multiple all-solid-state thin-film batteries 100 may be stacked in such a manner that the cathode terminal layers and the anode terminal layers 5 alternately appear on either lateral surface. In this case, the cathode terminal layers and the anode terminal layers 5 may be connected in such a manner that the multiple all-solid-state thin-film batteries 100 are in series connection.

Figure 4:
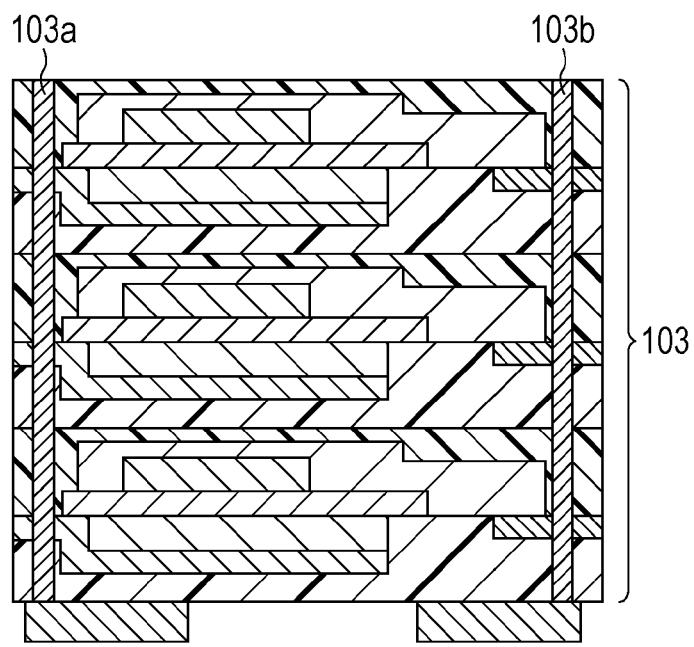
FIG. 4 is a cross-sectional diagram that illustrates an example of a structure of an all-solid-state thin-film battery according to Embodiment 1 in a third stacked form.

FIG. 4 illustrates an example of a structure of a multilayer all-solid-state thin-film battery 103 in which multiple all-solid-state thin-film batteries 100 are connected with each other in a way different from that in FIG. 3.

The multilayer all-solid-state thin-film battery 103 has a cathode via 103a and an anode via 103b both extending through the multiple all-solid-state thin-film batteries 100. The cathode via 103a fills a through-hole that passes through the multiple cathode terminal layers included in the multiple all-solid-state thin-film batteries 100. The anode via 103b fills a through-hole that passes through the multiple anode terminal layers 5 included in the all-solid-state thin-film batteries 100. The cathode via 103a and the anode via 103b are made of, for example, electroconductive paste. Examples of materials for electroconductive paste include copper paste, silver paste, and carbon paste.

These multilayer all-solid-state thin-film batteries 102 and 103, in which multiple all-solid-state thin-film batteries 100 are connected without a thick substrate disposed therebetween, can exhibit a high energy density compared with known multilayer all-solid-state thin-film batteries. These multilayer all-solid-state thin-film batteries 102 and 103 can also have a high capacity because the multiple all-solid-state thin-film batteries 100 are stacked therein.

Figure 5:
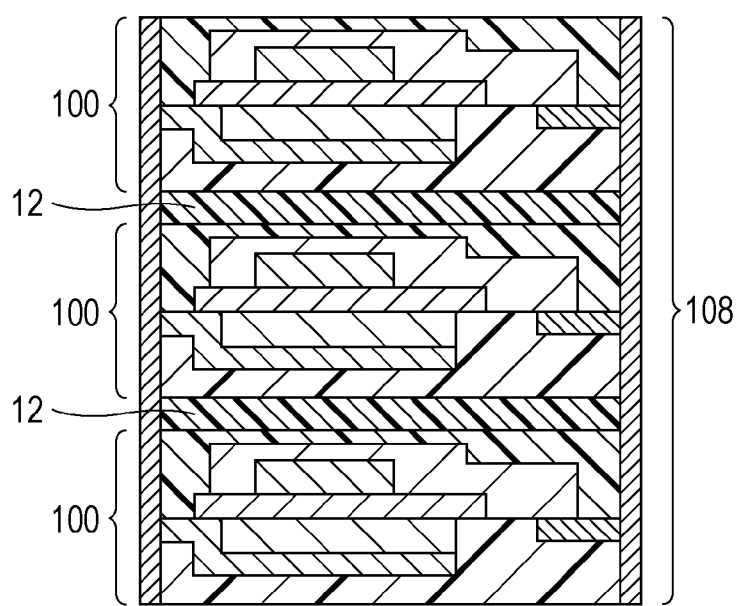
FIG. 5 is a cross-sectional diagram that illustrates an example of a structure of an all-solid-state thin-film battery according to Embodiment 1 in a fourth stacked form.

FIG. 5 illustrates an example of a structure of a multilayer all-solid-state thin-film battery 108 in which multiple all-solid-state thin-film batteries 100 are stacked in a way different from that in FIG. 3. The multilayer all-solid-state thin-film battery 108 has flexible plastic layers 12 between the multiple all-solid-state thin-film batteries 100. The multilayer all-solid-state thin-film battery 108 is flexible.

Examples of materials for the flexible plastic layers 12 include resin materials and solid lubricants. Examples of resin materials include polypropylene, polyethylene, polyethylene terephthalate, polytetrafluoroethylene (PTFE), silicone resins, and rubber-based resins. Examples of solid lubricants include graphite, titanium disulfide, and molybdenum disulfide.

[Manufacturing Method of the All-Solid-State Thin-Film Battery]

The following describes an example of a manufacturing method of the all-solid-state thin-film battery 100.

A manufacturing method according to this embodiment includes the following steps:

(I) forming a cathode active material layer on a temporary substrate;

(II) forming a cathode current collector layer on the cathode active material layer;

(III) separating the cathode active material and cathode current collector layers from the temporary substrate to expose a principal surface of the cathode active material layer;

(IV) forming a solid electrolyte layer on the principal surface of the cathode active material layer; and (V) forming an anode layer on the solid electrolyte layer, the anode layer including an anode current collector layer.

FIGS. 6A to 6I illustrate specific examples of the individual steps of a manufacturing method according to this embodiment.

Figure 6A:
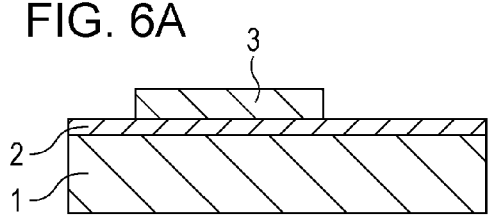
FIGS. 6A to 6I are cross-sectional diagrams that illustrate an example of a method for manufacturing an all-solid-state thin-film battery according to Embodiment 1.

FIG. 6A illustrates a step of forming a release layer 2 and then a cathode active material layer 3 on a temporary substrate 1 (step (I)).

Examples of methods for forming the cathode active material layer 3 include sputtering, vapor deposition, pulsed laser deposition, CVD, aerosol deposition, spraying, the flux method, and the sol-gel method. Examples of materials for the cathode active material layer 3 include $LiCoO_2$, $LiNiO_2$, $LiMn_2O_4$, $LiCoPO_4$, $LiMnPO_4$, $LiFePO_4$, and $LiNiPO_4$ as well as derivatives of these compounds obtained by substituting the transition metal with one or two different kind elements. Examples of such substituted materials include $LiNi_{1/3}CO_{1/3}Mn_{1/3}O_2$, $LiNi_{0.8}Co_{0.15}Al_{0.05}O_2$, and $LiNi_{0.5}Mn_{1.5}O_2$.

The cathode active material layer 3 is, for example, amorphous. The cathode active material layer 3 is annealed in an oxidizing atmosphere so that the characteristics of these materials can be fully exploited. The annealing temperature is, for example, in the range of 600° C. to 1000° C.

The temporary substrate 1 can be made of, for example, a material resistant to a temperature of 600° C. This allows the cathode active material layer 3 to be annealed at a temperature higher than in known manufacturing methods. The material for the temporary substrate 1 may also be resistant to a temperature of 800° C., 900° C., or 1000° C. Examples of materials for the temporary substrate 1 include a silicon wafer, quartz glass, and a platinum plate.

The release layer 2 has, for example, resistance to high temperatures in an oxidizing atmosphere. Examples of materials for the release layer 2 include silver, nickel, and cobalt as well as alloys containing these metals.

Examples of methods for forming the release layer 2 include sputtering and vapor deposition.

Figure 6B:
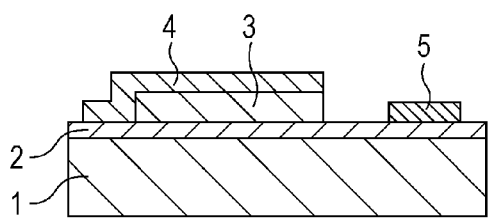

FIG. 6B illustrates a step of forming a cathode current collector layer 4 on the cathode active material layer 3 and forming an anode terminal layer 5 on the release layer 2 (step (II)). The anode terminal layer 5 is spaced from the cathode active material layer 3 and the cathode current collector layer 4. Examples of methods for forming the cathode current collector layer 4 and the anode terminal layer 5 include sputtering and vapor deposition.

Examples of materials for the cathode current collector layer 4 and the anode terminal layer 5 include aluminum, copper, gold, silver, platinum, and nickel as well as alloys containing these metals. These metals are highly electroconductive. This manufacturing method includes no step of annealing at a high temperature in an oxidizing atmosphere after step (I), thereby allowing for a wide choice of materials for the cathode current collector layer 4 and the anode terminal layer 5. The use of a cathode current collector layer 4 and an anode terminal layer 5 both made of aluminum, for example, can lead to reduced costs.

Figure 6C:
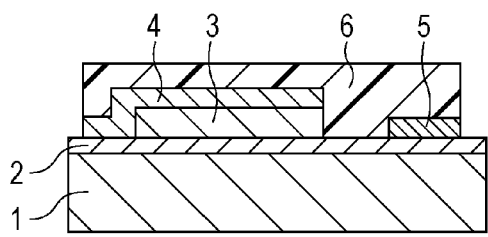

FIG. 6C illustrates a step of attaching a release film 6.

Examples of the release film 6 include a polyphenylene sulfide film and an aramid film. These are thermoplastic resin films. The release film 6 is attached to the cathode current collector layer 4 and the anode terminal layer 5 through thermal compression bonding.

A plastic layer may be formed instead of the release film 6. The plastic layer may be formed by applying epoxy resin to the cathode current collector layer 4 and the anode terminal layer 5 and drying the resulting coating, for example.

The release film 6 is used to separate the laminate of the release layer 2, the cathode active material layer 3, the cathode current collector layer 4, and the anode terminal layer 5 from the temporary substrate 1 in the next step. In addition to this, the release film 6 will function as a coating layer that protects the finished all-solid-state thin-film battery 100.

Figure 6D:
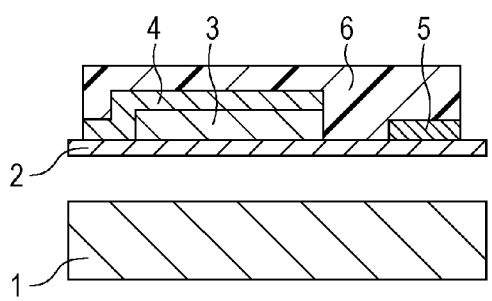

FIG. 6D illustrates a step of separating the laminate of the release layer 2, the cathode active material layer 3, the cathode current collector layer 4, and the anode terminal layer 5 from the temporary substrate 1 (step (III)).

Figure 6E:
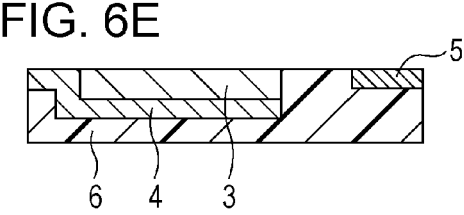

FIG. 6E illustrates a step of removing the release layer 2.

Examples of methods for removing the release layer 2 include wet etching and dry etching.

Wet etching is a process of removing the release layer 2 by dissolving it with acid. Examples of acids for this purpose include diluted hydrochloric acid, diluted sulfuric acid, and diluted nitric acid, mixtures of these acids, and acids obtained by adding an aqueous hydrogen peroxide solution to these acids or mixtures.

Examples of dry etching processes include reverse sputtering, ion milling, and etching with a reactive gas, ions, or radicals. Examples of gases for etching include sulfur hexafluoride ($SF_6$), carbon tetrafluoride ($CF_4$), trifluoromethane ($CHF_3$), and xenon difluoride ($XeF_2$).

Figure 6F:
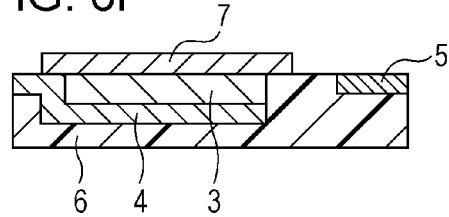

FIG. 6F illustrates a step of forming a solid electrolyte layer 7 on the principal surface of the cathode active material layer 3 exposed through the removal of the release layer 2 (step (IV)).

Examples of methods for forming the solid electrolyte layer 7 include sputtering, vapor deposition, pulsed laser deposition, CVD, aerosol deposition, spraying, the flux method, and the sol-gel method.

Examples of materials for the solid electrolyte layer 7 include sulfide-based lithium-ion-conducting solid electrolytes and oxide-based lithium-ion-conducting solid electrolytes. Examples of sulfide-based lithium-ion-conducting solid electrolytes include $Li_2S$—$SiS_2$ glass, $Li_2S$—$P_2S_5$ glass and glass ceramics, $Li_2S$—$B_2S_3$ glass, $Li_{3.25}Ge_{0.25}P_{0.75}S_4$, $Li_{10}GeP_2S_{12}$, and materials obtained by adding LiI or $Li_xMO_y$ (where M is any of P, Si, Ge, B, Al, Ga, and In, and x and y are positive real numbers) to these electrolytes. Examples of oxide-based lithium-ion-conducting solid electrolytes include LiPON, $Li_3Zr_2Si_2PO_{12}$, $Li_7La_3Zr_2O_{12}$, $Li_5La_3Ta_2O_{12}$, $Li_{1+x}Al_xTi_{2-x}(PO_4)_3$, $Li_{1.5}Ti_{1.7}Al_{0.8}P_{2.8}Si_{0.2}O_{12}$, and $La_{2/3-x}Li_{3x}TiO_3$.

Figure 6G:
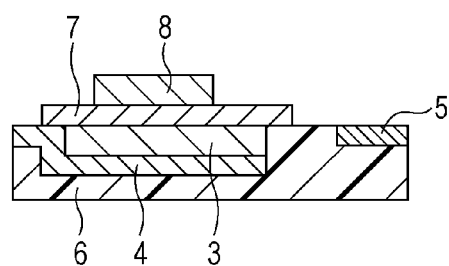

FIG. 6G illustrates a step of forming an anode active material layer 8 as a component of an anode layer on the solid electrolyte layer 7 (step (V)). The anode active material layer 8 is formed in such a manner that it faces the cathode active material layer 3 across the solid electrolyte layer 7.

Examples of methods for forming the anode active material layer 8 include sputtering, vapor deposition, and CVD. Examples of materials for the anode active material layer 8 include lithium, lithium alloys, indium, tin, lead, silicon, silicon oxides, and carbon materials.

The anode active material layer 8 may be omitted, if the all-solid-state thin-film battery 100 is charged/discharged as lithium is deposited/dissolved at an anode layer. In other words, an anode layer may consist of only an anode current collector layer 9.

Figure 6H:
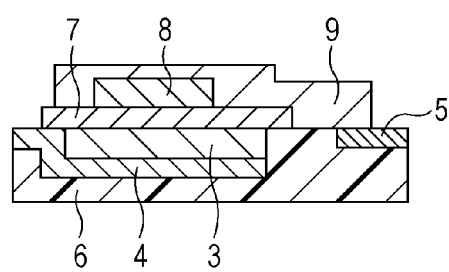

FIG. 6H illustrates a step of forming an anode current collector layer 9 on the anode active material layer 8 and connecting it to the anode terminal layer 5 (step (V)).

Examples of methods for forming the anode current collector layer 9 include sputtering and vapor deposition. The anode current collector layer 9 is made of, for example, a material that is unlikely to form an alloy with lithium and highly conductive to electrons. Examples of materials for the anode current collector layer 9 include copper, platinum, and nickel.

Figure 6I:
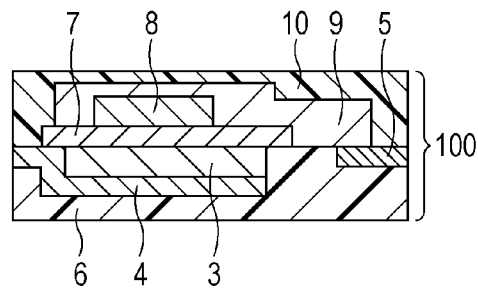

FIG. 6I illustrates a step of coating the solid electrolyte layer 7, the anode current collector layer 9, and any other component existing therebetween with a protective film 10.

Examples of materials for the protective film 10 include those mentioned for the release film 6 and para-xylylene polymers. A para-xylylene polymer can be formed using, for example, CVD.

An all-solid-state thin-film battery 100 is obtained through these steps.

This method, in which the cathode active material layer 3 is annealed at a high temperature, allows the characteristics of the cathode active material to be fully exploited. The separation of the temporary substrate 1, which ensures that the all-solid-state thin-film battery 100 has no thick substrate, can provide a high energy density and a high degree of reliability. The small number of layers stripped can limit the stripping-related damage to the device. A wide choice of materials is ensured for the cathode current collector layer 4, the coating layer 6, the solid electrolyte layer 7, and the anode layer because these layers are formed after the annealing of the cathode active material layer 3. Furthermore, this method is highly economical if the temporary substrate 1 is reused.

Embodiment 2

The following describes an example of a structure of a multilayer all-solid-state thin-film battery 110 according to Embodiment 2.

Figure 7A:
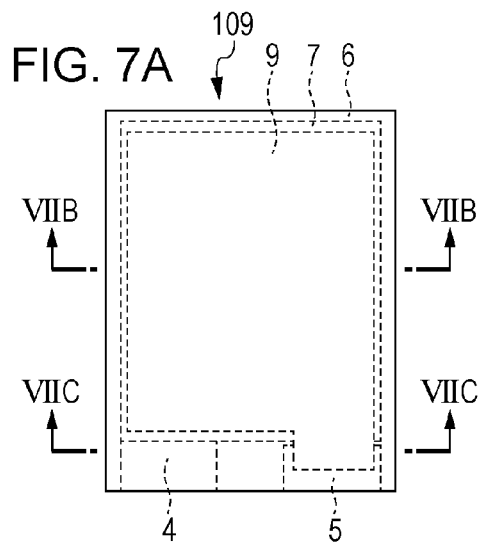
FIGS. 7A to 7F are diagrams that illustrate an example of a structure of an all-solid-state thin-film battery according to Embodiment 2.
Figure 7E:
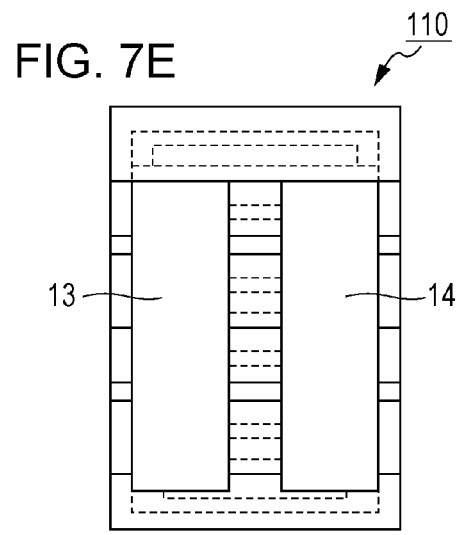
Figure 7B:
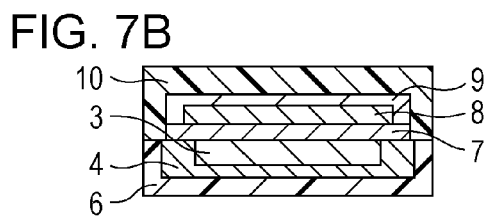
Figure 7C:
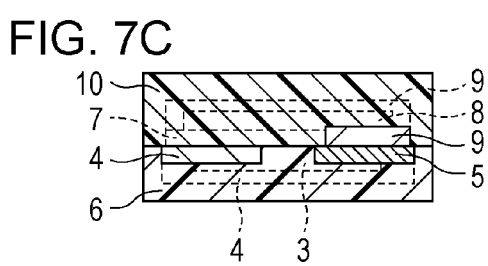
Figure 7F:
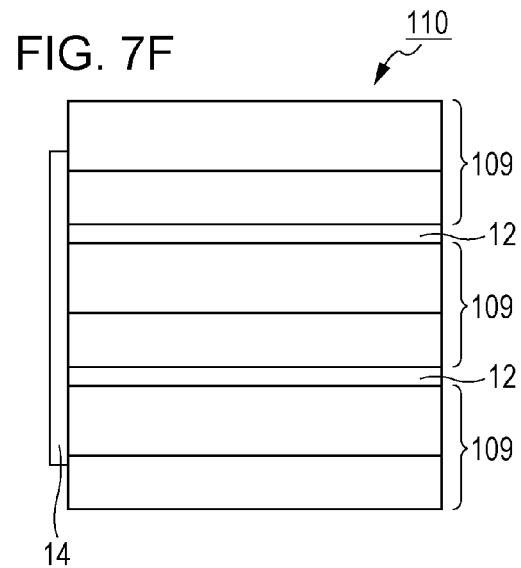
Figure 7D:
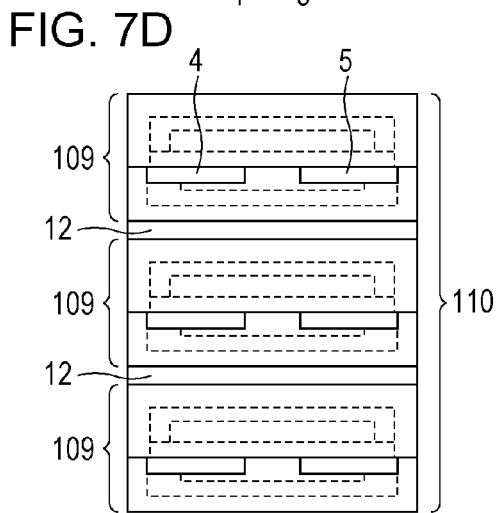

FIGS. 7A to 7F illustrate an example of a structure of a multilayer all-solid-state thin-film battery 110. FIG. 7A is a plan view of an all-solid-state thin-film battery 109 as a component of a multilayer all-solid-state thin-film battery 110. FIG. 7B is a cross-sectional diagram taken along line VIIB-VIIB in FIG. 7A. FIG. 7C is a cross-sectional diagram taken along line VIIC-VIIC in FIG. 7A. FIG. 7D is a side view of the multilayer all-solid-state thin-film battery 110 with a stack of multiple all-solid-state thin-film batteries 109. FIG. 7E is a side view of the multilayer all-solid-state thin-film battery 110 with a cathodic outer electrode 13 and an anodic outer electrode 14 on a lateral surface of the stacked multiple all-solid-state thin-film batteries 109. FIG. 7F is another side view of the multilayer all-solid-state thin-film battery 110 illustrated in FIG. 7E.

The components equivalent to those of the all-solid-state thin-film batteries 100, 101, and 102 described in Embodiment 1 have the same reference numerals as in that embodiment and are not described in this embodiment. The all-solid-state thin-film batteries 109 have the same structure as the all-solid-state thin-film battery 100, except that the outer ends of cathode current collector layers 4 and those of anode terminal layers 5 appear on the same lateral surface.

As illustrated in FIG. 7D, the multilayer all-solid-state thin-film battery 110 has flexible plastic layers 12 between the multiple all-solid-state thin-film batteries 109. This can provide a flexible multilayer all-solid-state thin-film battery 110.

As illustrated in FIGS. 7E and 7F, the multilayer all-solid-state thin-film battery 110 has a cathodic outer electrode 13 and an anodic outer electrode 14 on the same lateral surface. Ends of multiple cathode current collector layers 4 are connected with each other via the cathodic outer electrode 13, and ends of multiple anode terminal layers 5 are connected with each other via the anodic outer electrode 14. In particular, if the multilayer all-solid-state thin-film battery 110 is flexible, the cathodic outer electrode 13 and the anodic outer electrode 14 may be located on the same surface. This ensures that, for example, any bending stress applied to the all-solid-state thin-film battery 110 can be relaxed on the surface opposite the surface where the cathodic outer electrode 13 and the anodic outer electrode 14 are located.

Reference Embodiment

The following describes a reference embodiment of a method for manufacturing an all-solid-state thin-film battery.

FIGS. 8A to 8I illustrate an example of the individual steps of a method according to this reference embodiment for manufacturing an all-solid-state thin-film battery 104. Information that overlaps the descriptions in Embodiment 1 may be omitted.

Figure 8A:
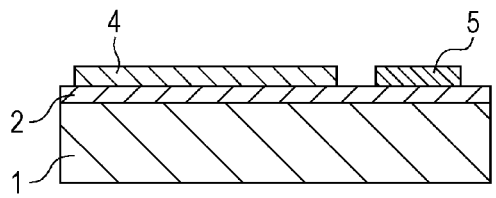
FIGS. 8A to 8I are cross-sectional diagrams that illustrate an example of a method for manufacturing an all-solid-state thin-film battery according to a reference embodiment.
Figure 8B:
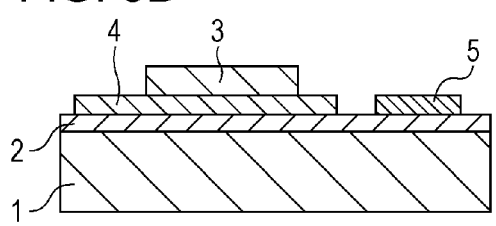
Figure 8C:
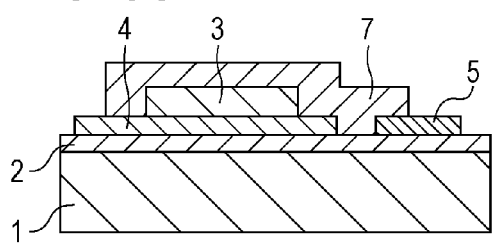
Figure 8D:
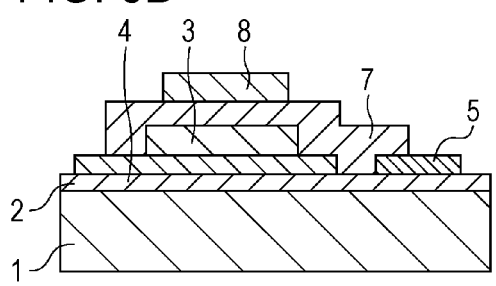
Figure 8E:
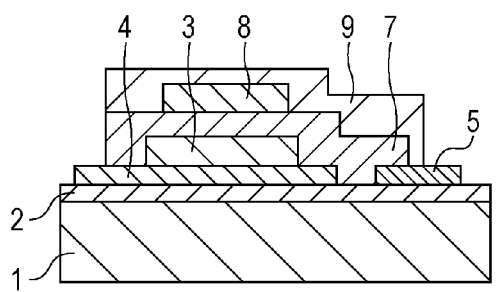
Figure 8F:
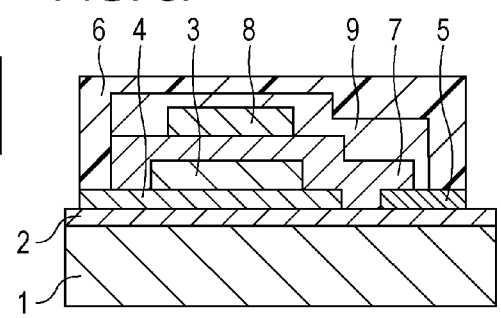
Figure 8G:
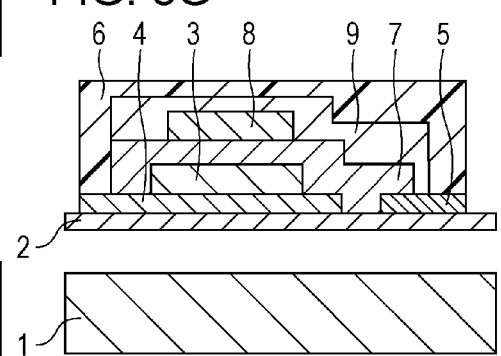

FIG. 8A illustrates a step of forming a release layer 2 and then a cathode current collector layer 4 and an anode terminal layer 5 on a temporary substrate 1. FIG. 8B illustrates a step of forming a cathode active material layer 3 on the cathode current collector layer 4. FIG. 8C illustrates a step of forming a solid electrolyte layer 7 on the cathode active material layer 3. FIG. 8D illustrates a step of forming an anode active material layer 8 on the solid electrolyte layer 7. FIG. 8E illustrates a step of forming an anode current collector layer 9 on the anode active material layer 8. FIG. 8F illustrates a step of attaching a release film 6. FIG. 8G illustrates a step of separating the release layer 2 and the laminate formed thereon from the temporary substrate 1 using the release film 6.

Figure 8H:
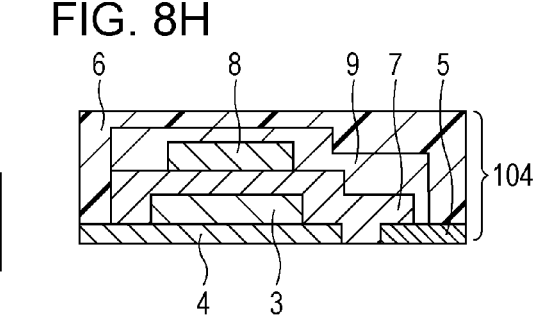

FIG. 8H illustrates a step of removing the release layer 2 from the laminate and exposing the principal surface of the cathode current collector layer 4 and the anode terminal layer 5 that has faced the release layer 2 to obtain the all-solid-state thin-film battery 104. The release layer 2 is removed using, for example, dry etching. The use of dry etching reduces the effects on the solid electrolyte layer 7 and the anode active material layer 8.

Figure 8I:
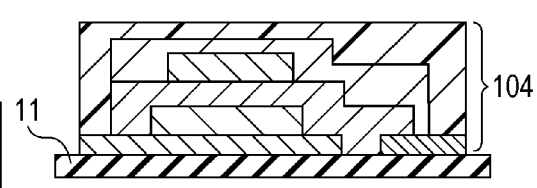

FIG. 8I illustrates a step of transferring and fixing the all-solid-state thin-film battery 104 to a permanent substrate 11. The permanent substrate 11 is an insulator for electrons. Examples of the permanent substrate 11 include plastic film and glass. The energy density of the all-solid-state thin-film battery 104 can increase with decreasing thickness of the permanent substrate 11.

Multiple all-solid-state thin-film batteries 104 may be stacked with no substrate therebetween as in FIG. 2. Stacked multiple all-solid-state thin-film batteries 104 may be connected with each other via outer electrodes as in FIG. 3, and they may also be connected with each other using electrode vias as in FIG. 4.

All-solid-state thin-film batteries according to the present disclosure can also be used in applications such as wearable equipment, portable equipment, hybrid vehicles, plug-in hybrid vehicles, electric vehicles, or stationary power supplies.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. An all-solid-state thin-film battery comprising:
a solid electrolyte layer including a first principal surface and a second principal surface opposite the first principal surface;
a cathode active material layer including a third principal surface and a fourth principal surface opposite the third principal surface, the third principal surface being in contact with a first contact surface of the first principal surface of the solid electrolyte layer;

a cathode current collector layer including a first portion and a second portion, the first portion being in contact with a second contact surface of the first principal surface of the solid electrolyte layer, the second portion being in contact with the fourth principal surface of the cathode active material layer;

an anode terminal layer spaced from the cathode active material layer and the cathode current collector layer; and an anode layer including a third portion and a fourth portion, a third contact surface of the third portion being in contact with the anode terminal layer, the fourth portion being in contact with the second principal surface of the solid electrolyte layer, wherein the first contact surface, the second contact surface and the third contact surface are located within a single plane, and wherein the solid electrolyte layer has a flat-plate shape.

2. The all-solid-state thin-film battery according to claim 1, wherein:
the third portion of the anode layer includes an anode active material layer; and
the fourth portion of the anode layer includes an anode current collector layer.

3. The all-solid-state thin-film battery according to claim 1, further comprising
a protective layer covering at least the solid electrolyte layer and the anode layer, the protective layer being in contact with the anode terminal layer within the single plane.

4. The all-solid-state thin-film battery according to claim 3, further comprising
a coating layer covering at least the cathode current collector layer and the anode terminal layer, the coating layer being in contact with the protective layer within the single plane.

5. The all-solid-state thin-film battery according to claim 1, further comprising
a coating layer covering at least the cathode current collector layer and the anode terminal layer, the coating layer being in contact with the solid electrolyte layer within the single plane.

6. The all-solid-state thin-film battery according to claim 3, wherein
the protective layer includes a step surface and a principal flat surface opposite the step surface, the step surface extending at least along the solid electrolyte layer and the anode layer.

7. The all-solid-state thin-film battery according to claim 4, wherein
the coating layer includes a step surface and a principal flat surface opposite the step surface, the step surface extending at least along the cathode current collector layer and the anode terminal layer.

8. The all-solid-state thin-film battery according to claim 1, wherein the cathode current collector layer and the anode terminal layer contain the same material.

9. The all-solid-state thin-film battery according to claim 1, wherein the cathode current collector is in contact with one of side surfaces of the cathode active material layer.

* * * * *